Aug. 11, 1964  HANS-HOLGER WIESE  3,144,123
BUCKET ELEVATOR
Filed Sept. 20, 1962
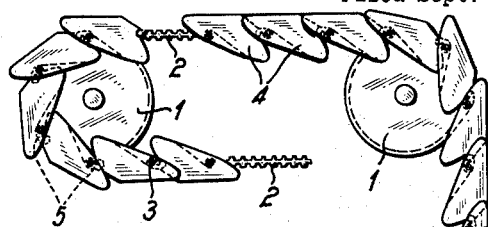
FIG.1
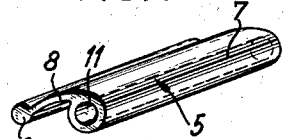
FIG.4
FIG.2
FIG.3
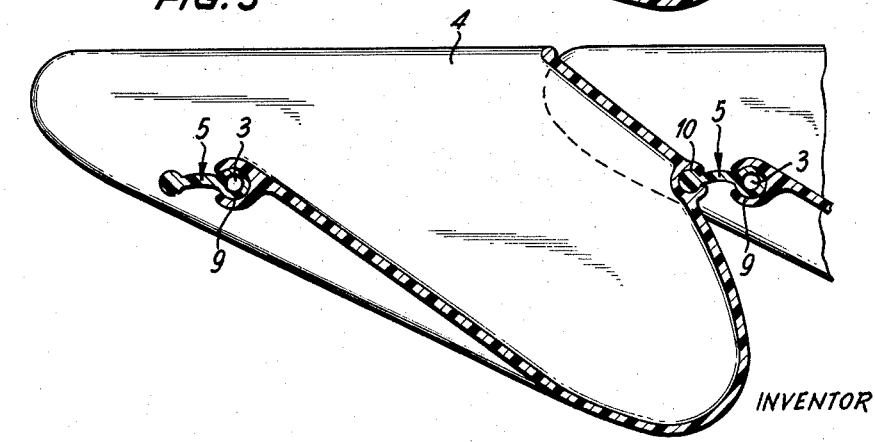
INVENTOR
Hans-Holger Wiese
BY
Richards & Geier.
ATTORNEYS

United States Patent Office 3,144,123
Patented Aug. 11, 1964

3,144,123
BUCKET ELEVATOR
Hans-Holger Wiese, Schmiedestrasse 24,
Hannover, Germany
Filed Sept. 20, 1962, Ser. No. 225,067
Claims priority, application Germany Sept. 25, 1961
5 Claims. (Cl. 198—149)

The present invention refers to a bucket elevator, and, more particularly, to an elevator, the buckets of which are carried by transverse studs of two endless toothed belts running over driving and deflection pulleys.

In chain elevators presently in use, the chains run over chain wheels, the pitch of which is as large as one bucket opening, so that the bucket is not subject to any deformation when passing a chain wheel. Contrary to this, where the bucket elevator consists of two endless toothed belts carrying the buckets, it is necessary that the pitch of the buckets can be shortened in the ratio of string to bow. In present day constructions, this is performed by employing flexible buckets which are capable of being deformed each time they pass a driving and deflection pulley. Apart from this regular deformation, there is an additional deformation of the flexible buckets which accelerates their eventual destruction, due to the fact that after a multitude of rotations, the two toothed belts are subject to mutual displacement, resulting in tilting of their transverse studs, and, at the same time, of the buckets suspended to them.

It is the principal object of the invention to eliminate deformation of any kind of the single buckets suspended to the transverse studs of the toothed belts, by providing for support of the buckets against one another in a manner specifically designed for this purpose, and thereby ensuring more inexpensive and yet more reliable working service and longer working life of the elevator.

Another object of the invention is to protect the bucket joints against intrusion of any substances to be conveyed by the elevator.

A further object is to construct an elevator which may be operated in horizontal, inclined and vertical direction and is adapted for continuous charging.

Still other objects and features, and the way in which the various objects of the invention are accomplished, will be apparent from the following more detailed specification and from the accompanying drawings, in which an embodiment of the invention is shown by way of an example.

In the drawings:

FIG. 1 is a diagram of a bucket elevator,

FIG. 2 is a cross section of a bucket,

FIG. 3 is a cross section of a modified embodiment of the bucket,

FIG. 4 is a supporting member partly in sectional and partly in perspective view.

Referring to FIGURE 1, the bucket elevator comprises several driving and deflection pulleys 1 guiding two endless toothed belts 2 made of rubber or plastic material. Because of their toothings, the two belts cannot be displaced against each other. Fastened to either belt are transverse bolts or studs 3 on which buckets 4 are suspended. The buckets 4 consist of a rigid plastic material of smooth surface, which will be helpful for easier discharge of the substances to be conveyed. As is apparent from FIGURE 2, each bucket 4 is swingably supported at a longitudinal side vertical to direction of motion by a transverse stud 3 arranged in a cylindrical groove 12 of the bucket 4. The opposite side of the bucket 4 by means of an elastic member 5 is articulately supported against the stud 3 of the next bucket. The elastic member 5 has the shape of a strip, profiled as shown in FIGURE 4. It consists of rubber or a yielding plastic material and, in order to increase its strength, may be armed with reinforcing lining of fabric or of a similar material. The elastic member 5 has roll-shaped end sides 6 and 7 which are connected with one another by a flat middle part or ridge 8. The roll-shaped cylindrical sides 6 and 7 are fitted into longitudinally slotted cylindrical grooves 9 and 10 of two neighbouring buckets. By means of its elastic ridge 8, the member 5 permits changes in distance between two transverse studs 3 as these are caused by the curvature of the belt on a pulley (difference between bow and string).

This difference may be modified to a certain extent by providing the pitch circle of the toothing of the pulleys 1 not to coincide with the pitch circle on which the transverse studs 3 are located. When the belt curves in one direction, this modification will cause diminishment of the difference, and will cause equal enlargement when the belt curves in opposite direction. However, in all cases, the elastic member 5 is capable of compensating these differences.

If, in its roll-shaped side 7, the elastic member 5 has a longitudinal groove 11, as shown in FIGURE 4, the mutual support of the buckets can be provided for according to FIGURE 3. In this modified construction, the placement of one bucket on transverse stud 3 coincides with the support of the neighbouring bucket in that the transverse stud 3 is introduced into groove 11 of elastic member 5, and the roll-shaped side 7 of the elastic member 5 is pushed into the longitudinally slotted groove 9 of the bucket. This makes groove 12 of FIGURE 2, superfluous.

FIGURE 1 shows the buckets 4 in the various positions of the bucket elevator, and the way in which the elastic member 5 operates in the various stages, can be clearly seen. The shape of the elastic members 5 is such that at the same time the gaps between the neighbouring buckets are covered by them. This avoids losses of the material to be conveyed, and also prevents intrusion into parts of the driving mechanism.

Due to the scalloped overlapping of the buckets, the bucket elevator, according to the invention, allows for continuous charging of the substances to be conveyed. As the bucket joints are protected by the elastic members 5, these substances are prevented from intruding into the joints and disturbing, or blocking, their functioning. The conveyance may take place in horizontal, inclined or vertical direction, and the toothed belt, carrying the buckets, may be guided over driving or deflection pulleys of comparatively small diameter.

Although the invention has been described in connection with certain particular embodiments, it is to be understood that the invention is not limited to these particular embodiments except insofar as they are specifically set forth in the following claims.

My claims are:

1. In a bucket elevator having two endless toothed belts of yielding material adapted to be guided over toothed pulleys, transverse studs carried by said belts and buckets swingably supported by said studs; elastic members between adjacent buckets, each elastic member having the shape of a strip comprising cylindrical end sides and a flat middle part, said cylindrical end sides fitting into cylindrical openings formed in said buckets to yieldably connect the elastic member to a transverse side of one bucket and to the transverse side of the next bucket.

2. The bucket elevator of claim 1, wherein said elastic member is reinforced by an embodied lining of fabric.

3. In a bucket elevator, two endless toothed belts of yielding material, toothed rolls guiding said belts, transverse bolts fastened to said belts, buckets swingably supported by said belts, a cylindrical groove in one transverse side of each bucket enclosing a bolt, longitudinally slotted grooves in opposite sides of said buckets, an elastic strip with roll-shaped ends in transverse direction, said roll-shaped ends fitting into said slotted grooves of the buckets, whereby the single buckets are articulately connected with each other.

4. In a bucket elevator, two endless toothed belts of yielding material, toothed rolls guiding said belts, transverse bolts fastened to said belts, buckets swingably supported by said bolts, an elastic strip with cylindrically reinforced transverse ends, a cylindrical groove in one of said both ends of the elastic strip, said bolt fitting into said cylindrical groove and forming an articulate support of one side of the bucket, the opposite side of which having a slotted groove into which the other cylindrically transverse end of said elastic strip fits, whereby the single buckets are articulately connected with each other.

5. A bucket elevator, comprising, in combination, driving and deflection pulleys, two endless toothed belts of elastic material guided over said pulleys, transverse studs carried by said belts, buckets, each of said buckets being swingably supported upon a separate stud upon one side of the bucket which extends transversely to the direction of movement of the bucket, and strip-like elastic members, each of said elastic members being connected with and extending between two adjacent buckets, the connection of each elastic member to one of the two adjacent buckets being upon the side opposite to that wherein the stud is located to provide an elastic supporting and tight connection between the two adjacent buckets.

References Cited in the file of this patent
UNITED STATES PATENTS

| | | |
|---|---|---|
| 1,491,641 | Stephens | Apr. 22, 1924 |
| 2,638,205 | Hapman | May 12, 1953 |
| 3,015,381 | Mohwinkel | Jan. 2, 1962 |